United States Patent [19]

Arion

[11] 3,956,115

[45] May 11, 1976

[54] PROCESS FOR THE REGENERATION OF ION-EXCHANGE RESINS AND APPLICATIONS THEREOF

[75] Inventor: Nicolae Mihai Arion, Bucharest, Romania

[73] Assignee: Institutul de Proiectari Pentru Industria Chimica Anorganica si A Ingrasamintelor, Bucharest, Romania

[22] Filed: June 23, 1975

[21] Appl. No.: 589,080

Related U.S. Application Data

[63] Continuation of Ser. No. 474,022, May 28, 1974, abandoned, which is a continuation-in-part of Ser. No. 313,091, Dec. 7, 1972, abandoned, which is a continuation of Ser. No. 80,019, Oct. 12, 1970, abandoned.

[30] Foreign Application Priority Data

Oct. 11, 1969 Romania................................ 61236

[52] U.S. Cl................................. 210/30 R; 71/34; 71/59; 71/63; 210/37 A
[51] Int. Cl.² ....................... C02B 1/70; C02B 1/76
[58] Field of Search ...................... 71/1, 34, 59, 63; 210/24, 25, 30, 32, 37, 38; 260/2.1 R, 2.1 M, 2.2 R; 423/396

[56] References Cited
UNITED STATES PATENTS

| | | |
|---|---|---|
| 3,144,321 | 8/1964 | Butikofer ................................ 71/59 |
| 3,475,330 | 10/1969 | Gilles .............................. 210/30 X |
| 3,579,322 | 5/1971 | Higgins .................................. 71/34 |
| 3,775,088 | 11/1973 | Higgins ........................... 423/396 X |

OTHER PUBLICATIONS

Higgins, Continuous Ion–Exchange of Process Water, *Chemical Eng. Progress*, June 1969, No. 6, pp. 59 and 60.

*Primary Examiner*—Charles N. Hart
*Assistant Examiner*—Robert H. Spitzer
*Attorney, Agent, or Firm*—Karl F. Ross; Herbert Dubno

[57] ABSTRACT

Cationic and anionic ion exchange resins are regenerated with highly concentrated acids or bases, under conditions such that the resin temperature at the interface regenerant-liquid or wash water/resin-bead does not rise above about 20°C. The control of this temperature is maintained by the corresponding correlation of the temperature, volume and circulating speed of the regenerant through a resin layer of reduced thickness. The concentrated effluent resulted in regeneration, with the eluated salt, is directly introduced into a technological process, in which the eluated salt and possible regenerant excess are recovered; if necessary, the effluent is processed in known ways.

5 Claims, 4 Drawing Figures

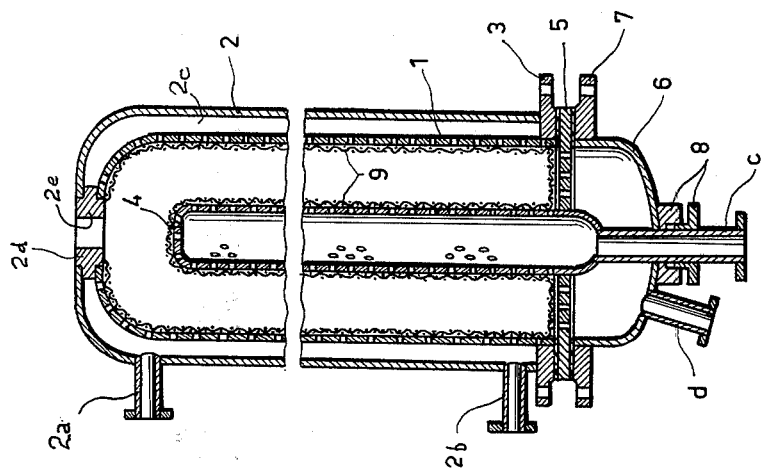
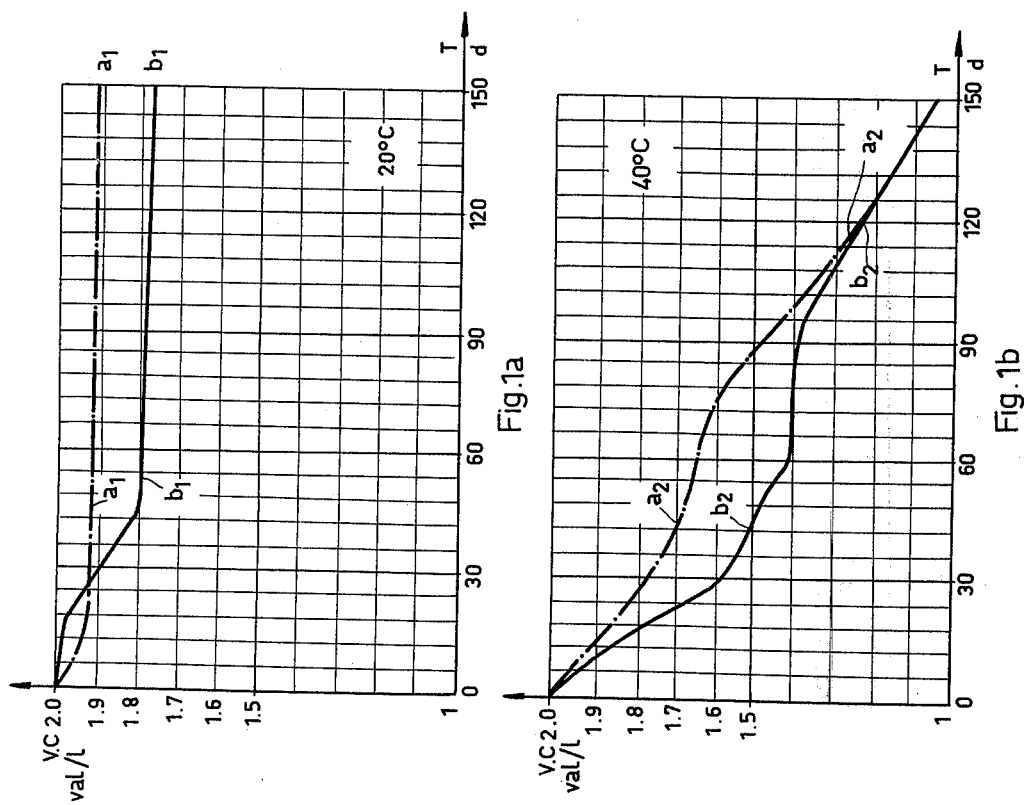

PROCESS FOR THE REGENERATION OF ION-EXCHANGE RESINS AND APPLICATIONS THEREOF

CROSS-REFERENCE TO RELATED APPLICATIONS

This application is a continuation of application Ser. No. 474,022, filed May 28, 1974, now abandoned which is a continuation-in-part of my copending application Ser. No. 313,091 filed Dec. 7, 1972 now abandoned which is a continuation of application Ser. No. 80,019 filed Oct. 12, 1970 and now abandoned.

FIELD OF THE INVENTION

The present invention relates to a process for the regeneration of cationic and anionic ion-exchange resins, with concentrated acids or bases, thereby obtaining a concentrated effluent from which the eluated salt and the possible excess of regenerant are advantageously recovered.

BACKGROUND OF THE INVENTION

The regeneration of cationic and anionic ion-exchange resins, currently applied for partial or total water demineralization, for treatments or purifications of waste water or of dilute salt solutions, for purifications, separations and recoveries of chemical products, etc., is usually carried out with diluted acid or basic solutions, as for example: 10% hydrochloric acid, 8 to 10% nitric acid, 1 to 5% sulphuric acid, 5% sodium hydroxide, 3% ammonium hydroxide, which do not arise any problems with regard to the resin degradation. The regenerating agent is used in excess of 120 to 200% as against the theoretically necessary quantity, and is thus diluted that its volume shall be of about twice the volume of the ion-exchange resin; the corresponding circulation speed is of 4 to 8 m/h; the usual contacting time within the resin is of about 30 minutes; the resin may be exploited at a useful capacity of about 60% as against the total one. The thickness of the resin layer is of 1000 to 1500 mm. Under these conditions, the regeneration may be carried out conveniently in the same reactor where the fixing on ion exchangers takes place.

During the last time, the specialist literature mentions the use of more concentrated acids for the regeneration of ion exchangers, as, for example, 15 to 22% nitric acid. A known process regenerates the cationic resin with 22% nitric acid and the anionic resin with 7% ammonia solution. When using 40% nitric acid, rapid degradations of the resins are stated. It is considered that the use of 50% nitric acid may even lead to explosions.

By these known processes diluted or relatively diluted salt solutions are obtained by regeneration, whose concentration is carried out in additional facilities for evaporation in stages, at high operation costs. The electro-dialysis in cells, with selective ion exchange diaphragms, does not offer either a more advantageous processing solution.

The fast development of the chemical industry has led to the discharge of waste waters and diluted solutions with anion and/or cation content, in ever larger volumes, whose discharge in rivers and lakes cannot be practiced any longer. The usual purifying methods by neutralization, inactivation or destruction of the components, are neither agreeable any longer. New advantageous technical processes for waste water purification and recovery of the components are called for, which shall also allow the recycling of the purified water.

Among the known technological valorization processes — waste water concentration in vacuum evaporation facilities, electrodialysis in cells, with selective ion exchange diaphragm, stripping by steam or air — it seems that the processes based on the use of ion-exchange resins, in discontinuous facilities with fixed bed or in continuous facilities with moving bed, are capable of becoming the most advantageous, and it is toward them that the present invention is directed.

OBJECTS OF THE INVENTION

For the purification and valorization of waste water and/or of diluted anionic and/or cationic slutions, by the use of ion-exchange resins, the present invention meets two objects: a) it obtains from the regeneration of ion exchangers exhausted with the ions from waste water, etc., an effluent with a possibly high content in cations and/or anions contained therein; b) the economic valorization of the effluent with the concentrated solutions in cations and/or anions, resulting from the regeneration.

SUMMARY OF THE INVENTION

In a treating process of a liquid influent, usually diluted, with cation or anion content, with a cationic or anionic ion exchange resin, the resin is exhausted by fixing thereof. The resin must then be regenerated for a new operating cycle, by passing through it of a liquid regenerant from which there results a liquid effluent with the eluated salt; wash water is then passed through the resin.

The first object aimed at, that is the reaching, out of the ionic resin regeneration, of effluents concentrated in salts, was performed according to the invention, by regenerating the ion exchangers with strongly concentrated acids and/or bases. The concentrations of the acids and bases used in regeneration according to the invention, are much higher than those known as used heretofore. They are exmplified further down.

To this end, the regenerating process of cationic and anionic ion-exchange resins that includes the ion regeneration with strongly concentrated acid, or base, respectively, is carried out under conditions such that the resin temperature at the regenerant liquid/resin bead interface does not exceed a maximum of about 20°C.

The new process is based on the experimental finding that the ion-exchange resins keep their physical-chemical characteristics unchanged in time, if a temperature of maximum about 20°C is maintained, during regeneration, in the superficial resin layer in contact with strongly concentrated acids, or concentrated bases, respectively.

As it was to be expected, the styrene-divinyl-benzene type, sulphonated resins, especially the microporous ones, have proved to be the most resistant cationic resins, their resistency degree being proportional to the cross-linking degree in divinyl-benzene groups (D.V.B.). The resins with high cross-linking degree — 12 to 20% D.V.B. — were found to be the most resistant. The carrying-out of the regeneration under the current and aforementioned conditions, by the use of strongly concentrated acids or bases, leads to rises in the resin layer temperature of up to values of 60° to 80°C, and even more, which conduct to a degradation of the resin structure and to material losses. The rise of the temperature is due to the heat quantities released in the course of regeneration, owing to the strongly exothermal reactions that take place: at the dilution of the concentrated regenerating agent, with the water from the interstices; at the neutralization of the regenerating agent ions, with the ions fixed by the resin in the exhaustion stage; at the dilution of the concentrated regenerating agent that was left in the interstices, with the rinsing water.

That's why the new process carries out the regeneration with concentrated acid or base, under conditions of removal of the exothermal heat from the resin layer.

According to the process, the temperature at the regenerant liquid/resin bead interface is maintained at a maximum of about 20°C, by correspondingly correlating the temperature, volume and circulation speed of the regenerant and the thickness (height) of the resin layer through which the regenerant passes.

The regenerant is used at the lowest possible temperature values, practically, for example, from 0° to 15°C. The regenerant temperature constitutes one of the important parameters in the process of taking over the released heat.

The much increased volume of regenerant used, with its raised caloric capacity as against that of the resin, is the second determinant parameter in taking over the heat released. Practically, regenerant volumes from 10 to 30 times the volume of the ionic resin subjected to regeneration hve proved satisfactory.

The circulation speed of the regenerant through the resin layer is a parameter that influences the heat transfer. The increased circulation speed is, by the way, determined by operating with an increased volume of the adopted regenerant. Practically, for the circulation speed there are adopted values from 10 to 50 m/h, without however exceeding, in each case, the speeds which would damage the physical structure of the resin used.

By selecting the parameters mentioned within the limits of the stated values, layers of ion exchange resins in thicknesses of about 600 mm may be conveniently used.

An important decrease of the heat amount released in regeneration, under the conditions of the invention, is reached by the removal, prior to introducing the concentrated regenerant, of the water from the ion exchange resin interstices; the heat released, corresponding to the dilution of the concentrated regenerating agent, with this water, is thus removed.

The same interest is also presented by the elimination, after regeneration, of the concentrated regenerating agent, left in the resin interstices. The operation leads to the removal of the heat released, corresponding to the dilution of the concentrated agent with the rinsing water.

The elimination of the liquid from the interstices of the ion exchange resin, water or concentrated regenerant, may be performed by blowing-in of compressed air or inert gas, ba vacuum suction, by centrifuging, or by combining these two means.

The strongly concentrated acid regenerant, used under the conditions of the invention, may be even the 45 to 60% concentrated nitric acid. In spite of the strong oxydizing action of this concentrated acid, it was now found experimentally that the ion exchange resin, of styrene-divinyl-benzene type, macroporous, with 12 to 20% D.V.B., resists perfectly, for a long time, if during generation, the temperature of the resin layer, at the interface with the regenerant, does not exceed a maximum of about 20°C. The very low amounts of organic matter, resulting from this resin degradation, make that the regeneration with concentrated nitric acid may be used even in manufacture processes in which the available organic matter is only allowed in very low limits (about 5 to 10 ppm). The highly concentrated acid regenerant may still be, for instance, 30 to 50% sulphuric acid, 25 to 35% hydrochloric acid, 30 to 45% phosphoric acid, a.s.o.

As an example of a highly concentrated basic regenerant, very frequently used, is the 20 to 25% concentrated ammonia solution. The concentrated basic regenerant may further be a solution of 5 to 25% natrium hydroxide, limited however to the value at which the resin is resistant at the temperature of about 20°C. As suitable anionic ion-exchange resins in using such basic regenerants there may be employed middle basic, macroporous, polyacrylic resins.

The new regeneration process may be applied on waste waters or diluted solutions that contain one or several cations and/or one or several anions; the regeneration is then carried out with the conveniently selected regenerants, so that the resulting and eluated salt or salts may be valorized under advantageous technical-economic conditions.

When in the waste waters, diluted solutions, a.s.o. there are present both cations and anions, that are fixed separately on cationic, or anionic, respectively, resins, the resin regeneration is carried out separately, with concentrated acid or base, respectively, regenerants, preferably containing the anion and cation present in the processed solution, while obtaining a concentrated mixture effluent.

When the conditions of a certain regeneration allow it, without sensibly decreasing the economicity, one of these regenerants may be used in lower concentrations.

Under the specific conditions of the new regeneration, much different from those of the resin exhaustion, the regenerating operation is carried out in a space (apparatus) different from that used in the resin exhaustion, exclusively intended for this purpose and provided with attending means which should allow: the hydraulic feeding and discharge of the exhausted or regenerated, respectively, resin; a uniform and compacted distribution of the relatively thin layer of exchange resin, disposed annularly or as a flat layer, the carrying out under good conditions of the operations of the regeneration process, that is: elimination of the liquid that was left in the resin interstices, the regeneration of the resin layer with the concentrated agent elimination of the concentrated agent that was left in the resin interstices, rinsing with water of the regenerant traces and hydraulic elimination of the regenerated resin.

The resin regeneration may thus be carried out by known dynamic processes, of filtering discontinuous or continuous centrifuging at atmospheric pressure or under vacuum; the regeneration may further take place during the resin transport on a conveyor belt. Due to the dynamic actions, these regeneration processes may give rise to a mechanical erosion degree of the resin bead, more or less marked, dependent on the resin mechanical characteristics and nature.

The removal to a high extent of this drawback is performed at the resin regeneration by known processes of static filtering, in which the resin is disposed in one or several cylindrical, co-axial or plane and parallel layers.

For such a static regeneration, the resin is preferably introduced into a static, discontinuous and cylindrical apparatus, in which it forms a single filtering, cylindrical, co-axial layer, comprised in a filtering space; in this space, the resin is loaded and unloaded, suspended in liquid.

In a case of the assembly process of exhaustion-regeneration, the regenerated resin is received into an upper tank, from which it is fed, by fall, into an exhaustion reactor; from here, it is passed, also by fall, into a static discontinuous and cylindrical regenerating apparatus, wherefrom, regenerated, the resin is brought back into the upper tank; all conveyances of the ion exchange resin are carried out by hydraulic transport.

When for regeneration concentrated nitric acid is used, it may have a concentration of 45 to 60%. Such an acid, the resin and the process according to the invention allow the industrial performing of more than 20,000 cycles of exhaustion-regeneration, without deterioration. If concentrated ammonia solution is used, this may have a concentration of 20 to 25% $NH_3$; under the conditions of the process, the anionic resin may be used for more than 20,000 operation cycles.

The second object of the invention, that is the economic valorization of the effluent with cation and anion solutions, resulting from the ion-exchange resin regeneration, can be reached in two ways:

— b'. by introducing the resulting concentrated effluent, with the eluated salt, into a technological process that uses efficiently the eluated salt. In case the reintroduction stage of the technological process has an acid medium, then the cationic resin regeneration may be carried out with a longer acid excess, so that the effluent may remain acid. In case the respective stage has an alkaline medium, the anionic resin regeneration is carried out with a larger basic excess. If the liquid influent contains both cations and anions, it is passed in succession through a cationic ion-exchange resin and an anionic one; each one of the resins is regenerated by the passing of a liquid regenerant containing ions corresponding to the ion (ions) to exhaust the other resin; the two liquid effluents with the eluated salts and the non-combined regenerants are mixed up; the resulting mixed effluent, with the eluated salts and with the excess of one of the two regenerants, is the concentrated effluent that is introduced into the technological process directly valorizing both the eluated salts and the regenerant excess.

— b''. If the resulting concentrated effluent, with the resulting salt, does not find a direct utilization, neither on the spot, nor if transported anywhere else, it may be processed, in view of its valorizing, by the different known methods, as for instance evaporation, concentration, distillation, cristallization or the like, with a view to obtaining the respective components in a pure state. To this end, the liquid effluent, containing the eluated salt and the regenerant excess, is passed for several times through the exhausted ion-exchange resin, instead of fresh liquid regenerant, until substantial or total consumption of the regenerant excess; there finally results a liquid, concentrated effluent in the eluated salt (salts). The high effluent concentration obtained by applying the new regeneration process of the ion-exchange resins, renders the processing by these ways much more economic.

Finally, the purification and valorization of waste waters and diluted solutions, etc., by fixing their components on ion exchangers, that may be regenerated according to the invention, leads not only to their purification, by fixing the components. The water resulting as effluent in the fixing process of its ions is an advancedly demineralized water. By its simple further passing over ionic resins in mixed bed, the fixing of possible ionic leakages is ensured; the purified water, thus resulted, becomes a sure advancedly demineralized water of high purity (with electric conductivity of 0.2 to 0.5 $\mu S/cm$). It may thus be used in feeding steam boilers or in different other technological processes.

BRIEF DESCRIPTION OF THE DRAWING

The above and other objects, features and advantages of the present invention will become more readily apparent from the following description, reference being made to the accompanying drawing in which:

FIG. 1a is a graph showing the behavior with time of a styrene-divinyl-benzene ion-exchange resin subjected to prolonged treatment with nitric acid, according to the present invention;

FIG. 1b is a graph similar to FIG. 1 but illustrating the behavior of the resin when the temperature is above the maximum of the present invention;

FIG. 2 is a longitudinal section through a static regenerating apparatus of the vertical cylindrical filter type according to the invention and FIG. 3 is a flow diagram illustrating a facility with fixing reactors on ion exchangers and regenerating apparatuses, according to the invention.

SPECIFIC DESCRIPTION AND EXAMPLES

Example 1

Figure 3:
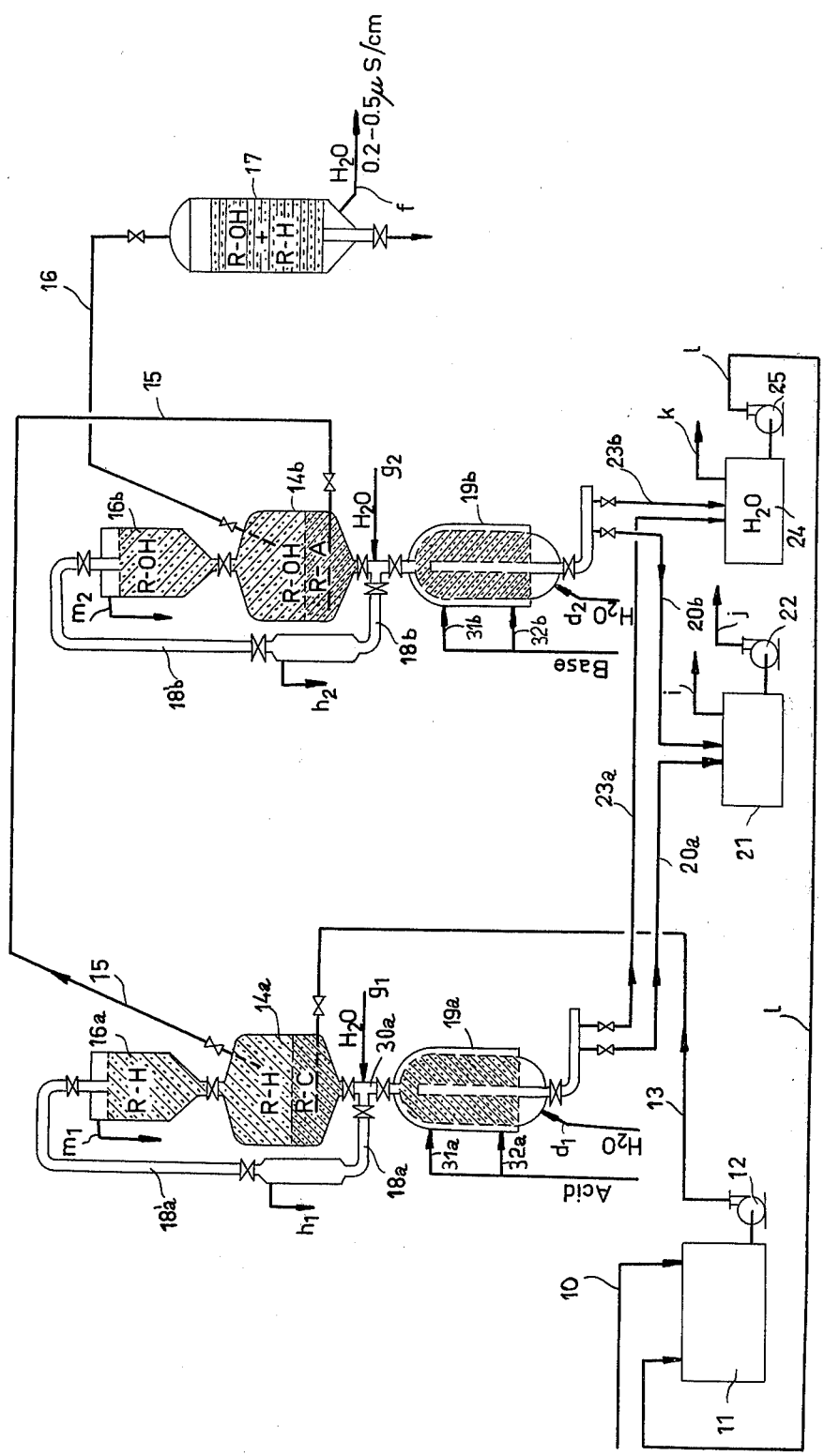

The behavior with time of a ion-exchange resin with 50% nitric acid (See FIGS. 1a and 1b).

A macroporous, sulphonated styrene-divinyl-benzene ion-exchange resin, with a cross-linking degree of 12% D.V.B. is used. Such a resin is known under the trade name of: Duolite C 21Hi (trade-mark). Two resin variants are used: resin A, sulphonated at 100°C and resin B, sulphonated at 130°C, under current sulphonation conditions.

The original characteristics of the tested resin are as follows:

|  | Resin A | Resin B |
| --- | --- | --- |
| Volume exchange capacity, V.C. | 2.01 val/l | 2.01 val/l |
| Weight exchange capacity, W.C. | 4.54 val/kg | 4.54 val/kg |
| Dry matter (per liter of freely settled resin), D.M. | 441 g/l | 416 g/l |

Two batches of 300 cm³ each, of resin A (samples $A_1$ and $A_2$) and of resin B (samples $B_1$ and $B_2$) were introduced into 50% nitric acid, which covers them, and kept there for 140 days (d) at constant temperature of 20°C (samples $A_1$ and $B_1$) and of 40°C (samples $A_2$ and $B_2$). Every 15 days samples were taken for checking and the acid was replaced by fresh acid. Measurements were carried out on the samples, of volume exchange capacity, weight exchange capacity and dry matter. The swelling degree S.D. was calculated in percentages, considered as a mesure of the resin cross-linking degree.

The time variations (T) of the volume exchange capacities are presented in FIG. 1a (at 20°C, curves $a_1$ and $b_1$) and in FIG. 1b (at 40°C, curves $a_2$ and $b_2$).

It was found that the resin sulphonated at 100°C resists better than the resin sulphonated at 130°C. Also, that the samples maintained at 20°C exhibit an initial decrease of the volume exchange capacity, during the first 15 days, whereafter it remains constant for a long time; after 120 days, the reduction of volume exchange capacity was less than 10%. The samples maintained at 40°C showed a continuous decrease of volume exchange capacity; after 120 days, this was reduced by more than 50% and continued decreasing.

The variations with time of dry matter and swelling degree are given in the table below:

| Sample | Temperature °C | Dry matter | | | Swelling degree | | |
|---|---|---|---|---|---|---|---|
| | | Initial g/l | After 90 days g/l | After 140 days g/l | Initial % | After 90 days % | After 140 days % |
| $A_1$ | 20 | 441 | 410 | 400 | 0 | 9.8 | 10.5 |
| $B_1$ | 20 | 446 | 406 | 394 | 0 | 7 | 8 |
| $A_2$ | 40 | 441 | 298 | 239 | 0 | 24.3 | 51 |
| $B_2$ | 40 | 446 | 292 | 225 | 0 | 38.9 | 54 |

On the other hand, the tests carried out on samples $A_1$ and $B_1$ have shown that the mass of the resins and the weight exchange capacities remained, practically, perfectly stable with time; this proves that the resin suffered no material losses with nitric acid. The decrease of volume exchange capacity, found in testing, was sensibly determined by the swelling of the resin.

Similar results were obtained also in the case of macroporous sulphonated styrene-divinyl-benzene resins, with a high cross-linking degree, known under the following Trade names: Imac C 16 P, Amberlite C 200, Relite CFZ, Zerolit 625, etc.

The experiments have established that the sulphonated styrene-divinyl-benzene resins, with a high cross-linking degree of 12 to 20% D.V.B. are perfectly resistant, for a long time, to concentrated nitric acid with 40 to 60% $HNO_3$, especially that if the sulphonation of the resin has been performed at a low temperature, and the temperature of the resin layer, in the course of regeneration, has not exceeded a maximum of about 20°C.

Under such conditions, they may be used without material losses in the acid used, during regeneration with concentrated acids, in accordance with the present invention; for their regeneration, the effluent will contain no organic matter.

Example 2

Regeneration of a ion-exchange resin, with strongly concentrated acid or base, in a vertical, cylindrical filtertype, static regenerating apparatus, with a single co-axial filtering layer, with loading and unloading at the upper part (see FIG. 2).

The apparatus consists of a cylindrical filtering body, with a welded, perforated spherical bottom 1, located within a cylindrical shell, with a spherical bottom 2, both being welded to the lower flange 3. The shell is provided with sockets (nozzles) $a_1$, $a_2$; the body 1 and the shell 2 are connected, at the upper part, through socket b.

Inside are located the filtering tube, with a closed spherical head 4, which is perforated and terminated, at the lower part, with socket c, welded to the intermediate, perforated plate 5, connected to flange 3.

The apparatus is closed at the lower part by a spherical bottom 6, welded to flange 7, by which it is connected to flange 3 and plate 5. The packing gland S seals off the passing of socket c, of the filtering tube 4, through the bottom 6, provided with socket d. A metal screen 9 lines the filtering body 1 inside, the filtering tube 2 outside and the crown of plate 5, at the upper face.

The apparatus is made of materials resistant to working media and provided with measuring and control instruments.

Into this apparatus, the exhausted ion-exchange resin is hydraulically loaded, at the upper part, through socket b. It is arranged and fils in a compact layer, the space between the filtering body 1, the filtering tube 4 and the plate 5, while the carrier liquid filters through tube 4 and flows out through socket c. The liquid remaining in the resin interstices is discharged through socket c, applying suction under vacuum.

The regenerating agent introduced into shell 2, through sockets $a_1$, $a_2$, is distributed uniformly and traverses the resin layer, from outside inside, and is subsequently discharged through tube 4 and socket c.

After the regeneration of the resin, the regenerating agent, remaining in the interstices, is expelled through socket d, by blowing-in air or inert gas (nitrogen), or by applying suction under vacuum, through socket c. Regenerant traces are eliminated by rinsing with demineralized water, introduced through sockets $a_1$, $a_2$ and discharged through filtering tube 4 and socket c.

The discharge of the regenerated and washed ion-exchange resin, from the apparatus, is performed hydraulically, through socket b, by introducing water, through socket d. The regenerated ionic resin is transferred back to the ionic fixing reactor.

Example 3

Application of the regeneration with highly concentrated acids and bases. For the treating and recovery of a liquid influent with content of cations $C^+$ and anions $A^-$ (waste water or diluted solution of a salt or salts). In this process, a treating operation with concentrated acid, corresponding to anion $A^-$ is present, as well as a subsequent treating operation, with a base concentrated in cation $C^+$.

The application is carried out in a plant with two separate sections for the influent anions and cations; the fixing is performed on ion-exchange resins, cationic R—H and anionic R—OH; each section has a fixing reactor with moving bed, continuous, and a regenerating apparatus, according to example 2, shown in FIG. 3.

The liquid influent with cations $C^+$ and anions $A^-$, fed into tank 1, through pipe e, are sent, by means of pump 2, through pipe 3, into the cation fixing reactor $4_1$, where the cations $C^+$ are integrally retained, in the form of R—C, in the lower R—H resin layer. The resulting acid effluent, removed at the upper part, is conveyed through pipe 5, to the anion fixing reactor $4_2$; it passes here, in upward direction, through the R—OH resin layer, which integrally remains the anions $A^-$, in the form of R—A. The demineralized effluent leaves the reactor, at the upper part, through pipe 6 and is finished in the mixed bed filter 7, filled with mixed cation and anion resins, which retain possible ion leakages. The totally demineralized high-purity water (0.2 to 0.5 $\mu$S/cm electrical conductivity), is led to utilization through pipe f.

The exhausted resins, from the lower zone of the fixing reactors $4_1$, $4_2$, are discharged, by portions, at the lower part, into pipes $8_1$, $8_1'$, and $8_2$, $8_2'$, respectively, where they are loosened, by introducing demineralized water, in upward direction, through pipes $g_1$, $g_2$. The water is eliminated through pipes $h_1$, $h_2$. The loosened resins and with the fine chippings separated by wet classification, are hydraulically discharged into the regenerating apparatuses $9_1$, $9_2$.

In these apparatuses, the water elimination from the resin interstices, the introduction of the concentrated regenerating agent, the removal of the regenerant from the interstices and the rinsing of the regenerated resins are effected, as shown in example 2, through sockets $a_1$, $a_2$ and $a_1'$, $a_2'$; $c_1$, $C_2$; $d_1$, $d_2$, respectively.

The regeneration effluents and the regenerating agents, from the interstices of the resins, flowing out through pipes $10_1$, $10_2$, are collected in a vessel 11, by applying suction under vacuum, through pipe $i$, whence they are sent, by means of pump 12, to utilization, through pipe $j$, as a mixed effluent, with the excess from one of the regenerants. The carrier water, the water remaining in the interstices and the rinsing water, flowing through pipes $13_1$, $13_2$, are collected in vessel 14, with suction under vacuum, through pipe $k$, whence they are sent, by pump 15, to tank 1, through pipe 1.

The removal of the regenerated and washed resins, from the reactors $9_1$, $9_2$, is performed hydraulically, with water introduced through socket $d_1$ and $d_2$, respectively; the resins pass through pipes $8_1$, $8_1'$ and $8_2$, $8_2'$, respectively, into the feeding tanks $6_1$, $6_2$ the carrier water is eliminated through the overflows $m_1$, $m_2$, of the feeding tanks $6_1$, $6_2$.

It is to be understood that the treated influent may contain only cations, or anions, respectively. In such a case, the treating plant is limited only to the section afferent to the corresponding operation.

Under the conditions described above, there may be treated and recovered, for instance:

— waste water (condensates) from the manufacture of granulated ammonium nitrate, with a content of 1 – 3 g/l $NH_3$ and 2 – 6 g/l $NH_4NO_3$; as ion-exchange resins there are used; the cationic resin Duolite C 264, which is a strongly acid resin of styrene-divinyl-benzene type, with high cross-linking degree (16–20% D.V.B.), macroporous; the anionic resin Duolite A 366, which is a middle basic resin, polyacrylic, macroporous; as regenerants there are used: 50–60% nitric acid, in great excess, 18–22% ammonia solution, in small excess, respectively;

— condensates from the manufacturing process of ammonia, with a content of 0.5 – 1 g/l $NH_3$ and 4 –5 g/l $CO_2$; as cationic ion-exchange resin is used the cationic resin Duolite C 264, as above, or Amberlite C 200, or Zerolite 625, with similar composition and structure; as regenerant is used 45–60% nitric acid, or 40–50 % phosphoric acid, or 40–50% sulphuric acid each of them in excess;

— waste diluted solution, with a content of 50 – 30 g/l phosphoric acid, from the manufacture of this acid, by the phosphorite attack with sulphuric or nitric acid; the used cationic resin is Duolite A 366, as above; as regenerant, a 22% ammonia solution, in small excess, is being used.

In the cited examples, the regeneration of the used using resins is carried out by maintaining the resin temperature at the interface liquid/resin bead at maximum about 20°C, while using previously cooled down to about 18°C, regenerants cooled down to 12°–15°C; with the circulating speed of the regenerants of 15–18 m/h, in volumes of 12 vol./vol. resin and through a resin bed of maximum 600 mm thickness; under previous removal of the water and regenerant from the resin interstices, by blowing-in with nitrogen.

The application of the invention leads to the following advantages:

— the possibility of regenerating ion-exchange resins with highly concentrated acids or bases, preferred without degradation or diminution of the physical-chemical characteristics of the resins, which opens a new and large field of use of ion-exchangers, with multiple applications, in the purification and the valorization of waste waters and diluted solutions, recovery of chemicals, concentration and purification of substances, valorization of wastes, etc.;

— the use of simple facilities, with low investment and operating costs, adaptable to automation processes.

We claim:

1. A continuous process for treating and recovering an ion containing liquid influent, with an ion exchange resin, bu portions, comprising 1. asecndent flowing a stream of liquid influent with cations, through a first fixing zone of a cation exchange unit, of a loop system, containing therein a compacted bed of strongly acidic cation exchange resin, of styrene-divinyl-benzene type, with high cross-linking degree, having 16–20% divinyl-benzene, sulphonated at 100°C, in beads, macroporous, whereby the stream of liquid influent with cations, flowing through said first zone, in said cation exchange unit, contacts said cation exchange resin and exchange the cations in the stream of liquid influent for the hydrogen ions of the cation exchange resin;

2. withdrawing a decationized liquid influent stream, from said first zone of said cation exchange unit;

3. hydraulically passing said cation exchange resin, loaded with cations, from step (1), into a second zone, in said cation exchange unit, discharging the liquid and removing any non-discharged liquid remainder between the compacted beads of said exchange resin with a flow of inert gas;

4. contacting the cation exchange resin, loaded with cations and with the transport liquid removed from its interstices, from step (3), with a strongly concentrated nitric acid of 45 to 60%, by weight, used in great excess, as regenerant, to regenerate said cation exchange resin, under the conditions of maintaining the resin temperature at the interface of the regenerant acid/resin bead at a maximum of about 20°C, by suitably correlating the values of the regeneration parameters, i.e. the regenerant temperature of 0°–15°C, the regenerant volume of 10–30 times the resin bulk volume, the circulating bulk velocity of the regenerant of 10–50 m/h, and the thickness of the resin bed of a maximum of 0.600m;

5. withdrawing an effluent strongly concentrated in nitric acid and with the eluated salts from the regeneration of said exchange resin, at step (4), from said cation exchange unit;

6. removing any remainder of said strongly concentrated effluent, from step (5), which has remained non-discharged in the interstices between the beads of said exchange resin, with a flow of inert gas;
7. rinsing the regenerated cation exchange resin from step (6) with cooled rinsing water;
8. hydraulically passing said cation exchange resin, rinsed at step (7), into a third loosening zone of said cation exchange unit, wherein fine resin particles which have resulted in steps (1)–(7) are eliminated, in an ascendent water flow, said fine particles being eliminated by overflowing, drawn out by the loosening water;
9. hydraulically passing said cation exchange resin, loosened by water at step (8), into a fourth feeding zone of said cation exchange unit, wherein the transport water is removed by overflowiing, while the resin is compacted;
10. hydraulically passing said cation exchange resin, compacted at step (9) from the feeding zone, into the first cation fixing zone, of step (1), in said cation exchange unit and discharging therefrom the hydraulic transport water;
11. and repeating the same cycle of steps (1)–(10), in said cation exchange unit, as long as desired;
12. ascendent flowing the stream of liquid influent with ions, decationized in step (11) and withdrawn in step (2), through a first fixing zone of a anion exchange unit, of a loop system, containing therein a compacted bed of middle basic anion exchange resin, of polyacrylic type, in beads, macroporous, whereby the stream of liquid influent with anions, flowing through said first zone, in said anion exchange unit, contacts said anion exchange resin and exchanges the anions in the stream of decationized liquid influent for the hydroxyl ions of the anion exchange resin;
13. withdrawing a stream of dimineralized liquid influent from said first zone of said anion exchange unit;
14. hydraulically passing said anion exchange resin, loaded with anions at step (12), into a second zone of said anion exchange unit, dischargint the liquid and removing any non-discharged liquid remainder between the compacted beads of said anion exchange resin, with a flow of inert gas;
15. contacting the anion exchange resin, loaded with anions, and with the liquid removed from its interstices, at step (14), with strongly concentrated ammonia solution of 20 to 25% by weight, used in small excess, as regenerant, to regenerate said anion exchange resin;
16. withdrawing an effluent, concentrated in the eluated salts, also containing the small ammonia excess, from the regeneration of said exchange resin, at step (15), in said anion exchange unit;
17. removing any remainder of said effluent concentrated in eluated salts, from step (16), which has remained non-discharged in the interstices between the beads of said exchange resin, with a flow of inert gas;
18. rinsing the regenerated anion exchange resin from step (17) with rinsing water;
19. hydraulically passing said anion exchange resin, rinsed at step (18), into a third loosening zone of said anion exchange unit, wherein fine resin particles which have resulted in steps (12)–(19), are eliminated, in an ascendent water flow, said fine particles being eliminated by overflowing, drawn out by the loosening water;
20. hydraulically passing said anion exchange resin, loosened by water at step (18), into a fourth feeding zone of said anion exchange unit, wherein the water is removed by overflowing, while the resin is compacted;
21. hydraulically passing said anion exchange resin, compacted at step (20), from the fourth feeding zone into the first anion fixing zone, at step 12, in said anion exchange unit and discharging therefrom the hydraulic water;
22. and repeating the same cycle of steps 12–21 in said anion exchange unit, as long as desired; and
23. passing the demineralized liquid influent flow, from step (13), through ion exchange resins, in a mixed bed, to remove any escaped cations and anions, and utilizing the effluent as highly demineralized water.

2. The process, according to claim 1, further comprising the direct introduction of the effluent withdrawn from regeneration, from step (5) or, the effluent from step (16), into a technological process, which directly makes available, both the eluated salts, and the regenerant excess.

3. The process, according to claim 2, in which an effluent strongly concentrated in acid results from regeneration in step (4), said strongly concentrated acid being selected from the group which consists of 30-50% sulphuric acid, 30-45% phosphoric acid, and 25-35% hydrochloric acid.

4. The process, according to claim 1, further comprising the repeated passing of the effluent withdrawn from regeneration, selected from the group which consists of the effluent strongly concentrated in acid and with the eluated salts, from step (5), and the effluent concentrated in eluated salts, from step (16), the latter dosed anew at each new passing, by the amount of basic regenerant, through the cycle of steps (4)–(6), (15)–(17), respectively, until there results an effluent saturated in the eluated salts and, practically, with no regenerant excess, whereupon the effluent is processed in known ways.

5. The process, according to claim 4, in which an effluent strongly concentrated in acid results from regeneration in step (4), said strongly concentrated acid being selected from the group which consists of 30–50% sulphuric acid, 30–5% phosphoric acid, and 25–35% hydrochloric acid.

* * * * *